June 17, 1930.  C. C. SWEET  1,763,725
CHASE
Filed May 25, 1929
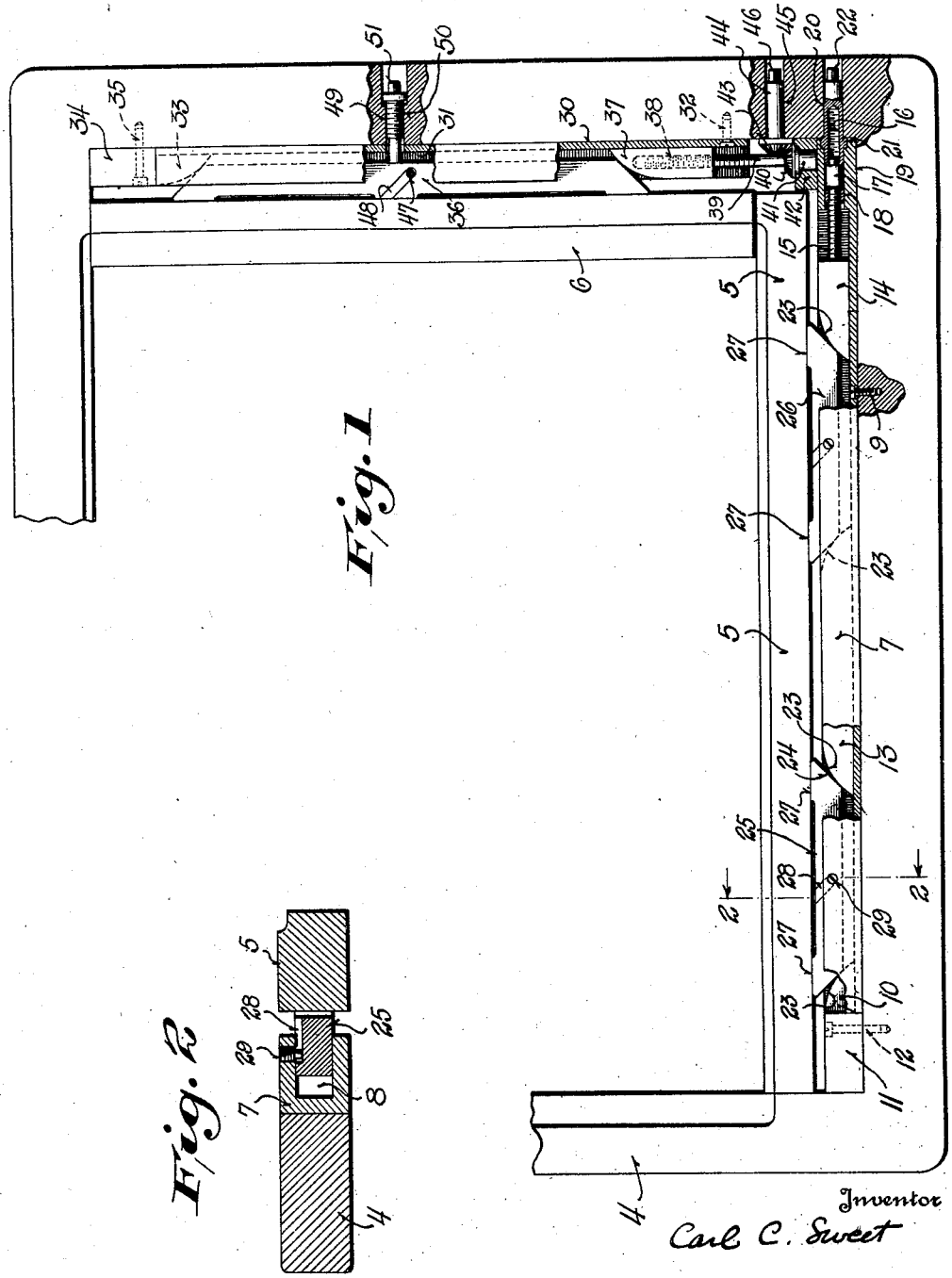
Inventor
Carl C. Sweet
By Charles T. French
Attorneys Patented June 17, 1930

1,763,725

UNITED STATES PATENT OFFICE

CARL C. SWEET, OF MILWAUKEE, WISCONSIN, ASSIGNOR TO CLAYBOURN PROCESS CORPORATION, OF MILWAUKEE, WISCONSIN, A CORPORATION OF WISCONSIN

CHASE

Application filed May 25, 1929. Serial No. 366,013.

The invention relates to a printer's chase and quoin.

The main object of the invention is to provide a quoin of simple and efficient construction and so associated with the chase as to efficiently perform its function of clamping the type in place therein, the quoin embodying cooperative wedge members mounted in frame members secured to the chase, the wedge members being operated by shafts mounted in the chase.

The invention further consists in the several features hereinafter set forth and more particularly defined by claims at the conclusion hereof.

In the drawings Fig. 1 is a plan view of a chase and quoin embodying the invention, parts being broken away and parts being shown in section;

Fig. 2 is a detail sectional view taken on the line 2—2 of Fig. 1.

In the drawings the numeral 4 designates the chase and 5 and 6 the type-engaging bars that are moved by the quoins into engagement with the type to firmly clamp the same in the chase.

The quoin for the longer side of the chase comprises a guide frame 7 having a longitudinally extending channel 8 milled or otherwise suitably formed therein, said frame being secured to the chase by a screw 9 adjacent one end and by the overlapping engagement of a wedge 10 at the other end, said wedge being formed on a block 11 secured by a screw 12 to the chase. A wedge 13 is mounted to slide freely in the channel 8 and a reciprocating wedge block 14 is also mounted in said channel and has a threaded shank 15 mounted in the threaded bore 16 of an operating member 17 which is mounted in a bore 18 in the end 19 of the frame 7 and in an alined bore 20 in the chase, the bore 18 being counterbored at its outer end to receive the annular shouldered portion 21 of the member 17 which has a squared end 22 for connection with a suitable turning crank. The outer side of the portion 21 abuts against the adjacent wall of the chase so that the member 17 is prevented from endwise movement and the thrust from the wedges is taken by the chase.

Each of the wedges 10, 13 and 14 has curved wedge faces 23, the wedge 13 being engageable with the inclined face 24 of a wedge 25 slidably mounted in the channel 8 and the wedges 10 and 14 being engageable with similar faces on this wedge and wedge 26 respectively. These wedges 25 and 26 have flat faces 27 spaced apart and engageable with the bar 5.

To prevent the wedges 25 and 26 from accidentally falling out, each of these wedges has an inclined slot 28 formed therein in which a stop-screw 29 in the frame 7 works, the same engaging the end of said slot to limit the outward movement of the wedge and hence prevent its falling out of the frame and also preventing the wedge 10 from coming out of the frame.

With this construction, rotating the member 17 in a direction to cause a movement of the shank 15 toward the left, and consequently the wedge block 14, moves the wedge 26 and through it the wedges 13 and 25 and thereby causes the wedges 25 and 26 to be moved laterally relative to the wedges 10, 13 and 14 so as to move the bar 5 laterally into firm engagement with the type in the chase to clamp said type between said bar 5 and the opposite side of the chase.

The other quoin includes a frame member 30 having a longitudinally extending channel 31 milled or otherwise suitably formed therein, said frame being secured to the chase by a screw 32 at one end and by the overlapping engagement of a wedge 33 at the other end, said wedge being formed on a block 34 secured to the chase by a screw 35.

A wedge 36 is slidably mounted in the channel 31 between the wedge 33 and a reciprocating wedge 37 in said channel and mover laterally outwardly, to move the bar 6 into clamping engagement with the type in the chase, by the movement of the wedge 37.

For moving the wedge 37 the same is provided with a threaded bore 38 in which a threaded shaft 39 is mounted, said shaft having formed thereon, or suitably secured thereto, a bevel gear 40 whose hub 41 is journaled in a block 42 abutting the frame 7 and held in this position by the engagement of the bevel gear 43 with the gear 40, said gear 43 being formed on a shaft 44 journaled in a bore 45 in the chase adjacent the shaft 20 and having a squared end 46 for engagement with a suitable crank.

With this construction, turning the shaft 44 in the proper direction will, through the gears 43 and 40, rotate the shaft 39 and cause the wedge 37 to cooperate with the wedge 33 to move the wedge 36 laterally to type-clamping position.

Accidental displacement of the wedge 33 is prevented by the stop-screw 47 which is mounted in the slot 48 and associated therewith in the same way as the screws 29 with the wedges 25 and 26. The wedge 33 has a three-point engagement with the bar 6 and should there be any tendency for the center portion thereof to spring away from said bar, a jack-screw 49, mounted in a threaded bore 50 in the chase and having a squared end 51, may be turned inwardly to engage and exert pressure against the central portion of said wedge 36. With this arrangement the thrust from the wedges is taken by the adjacent sides of the chase through blocks 34 and 42 and frame member 7.

The surfaces of the wedges 33 and 37 are curved, while those of the wedge 36 are straight, inclined surfaces.

The construction above described provides a very simple and sturdy chase and quoin construction of few parts.

I desire it to be understood that this invention is not to be limited to any particular form or arrangement of parts except in so far as such limitations are included in the claims.

What I claim as my invention is:

1. In a chase, a quoin comprising a frame member having a channel therein, means for securing said frame member to one side of the chase including a wedge block extending into said channel and overlapping the web portion thereof, cooperative wedges slidably mounted in said channel, and means for operating said wedges.

2. In a chase, a quoin comprising a frame member having a channel therein, means for securing said frame member to one side of the chase including a wedge block extending into said channel, a reciprocating wedge mounted in said channel and having a threaded shank, a wedge freely slidably mounted in said channel, wedges cooperating respectively with said wedge block and freely slidable wedge and with said freely slidable wedge and said reciprocating wedge, and rotatable means for moving said shank having thrust engagement with the chase.

3. In a chase, the combination of adjacently disposed quoins, each quoin including a channelled frame, cooperative wedges slidably mounted in each of said frames, a fixed wedge at the end of each frame, and means for transmitting the thrust of said wedges to the chase.

4. In a chase, the combination of adjacently disposed quoins, each quoin including a channelled frame, cooperative wedges slidably mounted in each of said frames, a fixed wedge at the end of each frame, said cooperative wedges including movable wedges in the other end portion of each frame, screw shafts for operating said last named movable wedges, means for transmitting the thrust from one of said shafts to said chase independent of the frames, and means for transmitting the thrust from the other of said shafts through the adjacent frame member to the chase.

5. In a chase, the combination with the chase, of adjacently disposed quoins, each quoin including a channelled frame, cooperative wedges slidably mounted in each of said frames, a fixed wedge at the end of each frame, said cooperative wedges including adjacently disposed, movable wedges, screw-shafts for operating said last named movable wedges, one of said shafts being journalled in said chase at one end, an operating shaft journalled in said chase adjacent said last named shaft, and a gearing connection between said operating shaft and the other screw-shaft.

6. In a chase, the combination with the chase, of a quoin comprising a frame member having a channel therein, a fixed wedge at the end of said frame, cooperative wedges slidably mounted in said channel, one of said last named wedges having a threaded shank, an operating member having a threaded bore in which said shank is mounted, said member being journalled in and having thrust engagement with said chase.

7. In a chase, the combination with the chase, of a quoin comprising a frame having a wedge-receiving recess therein, wedges slidably mounted in said recess, a fixed wedge cooperating with said wedges to move certain of said wedges laterally of said frame, one of said wedges having a threaded shank, an operating member journalled in the chase and connected to said threaded shank to move the same, a quoin comprising a frame having a wedge-receiving recess, wedges slidably mounted in said last named recess, a fixed wedge cooperating with said last named wedges to move one of said wedges laterally of said last named frame, a screw-shaft connected to one of said last named slidable wedges, an operating member journalled in the chase, and a gearing connection between said last named operating member and said last named screw-shaft, said operating members being disposed in proximity to each other.

In testimony whereof, I affix my signature.

CARL C. SWEET.